(12) United States Patent
Sullivan et al.

(10) Patent No.: US 6,593,973 B1
(45) Date of Patent: Jul. 15, 2003

(54) METHOD AND APPARATUS FOR PROVIDING INFORMATION IN VIDEO TRANSITIONS

(75) Inventors: Gary E. Sullivan, Mansfield, TX (US); Kim C. Smith, Colleyville, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/531,953

(22) Filed: Mar. 21, 2000

(51) Int. Cl.[7] .................................................. H04N 9/74
(52) U.S. Cl. ...................... 348/584; 348/589; 348/731; 725/36; 725/32
(58) Field of Search .............................. 348/9, 10, 584, 348/586, 589, 598, 600, 569, 570, 731, 722, 705, 706, 559, 560; 725/35, 36

(56) References Cited

U.S. PATENT DOCUMENTS

| | | | |
|---|---|---|---|
| 3,943,280 A | 3/1976 | Kimura et al. ............ 175/7.5 R |
| 4,774,582 A | 9/1988 | Hakamada et al. ......... 358/183 |
| 4,974,085 A | * 11/1990 | Campbell et al. ........... 348/729 |
| 5,155,591 A | * 10/1992 | Wachob ....................... 725/35 |
| 5,311,317 A | * 5/1994 | Ogura et al. ................. 348/731 |
| 5,375,203 A | 12/1994 | Lambidakis ................. 395/162 |
| 5,404,316 A | 4/1995 | Klingler et al. ............. 364/514 |
| 5,422,674 A | 6/1995 | Hooper et al. .............. 348/409 |
| 5,452,023 A | * 9/1995 | Kim ............................ 348/731 |
| 5,493,638 A | 2/1996 | Hooper et al. .............. 395/135 |
| 5,534,942 A | * 7/1996 | Beyers, Jr. et al. ......... 348/569 |
| 5,557,724 A | 9/1996 | Sampat et al. .............. 395/157 |
| 5,559,562 A | 9/1996 | Ferster ....................... 348/584 |
| 5,598,222 A | 1/1997 | Lane ........................... 348/568 |
| 5,640,320 A | 6/1997 | Jackson et al. ............. 364/192 |
| 5,644,364 A | 7/1997 | Kurtze et al. ............... 348/584 |
| 5,666,548 A | 9/1997 | Grimm et al. ......... 395/800.01 |
| 5,694,332 A | 12/1997 | Maturi ....................... 364/514 |
| 5,724,091 A | 3/1998 | Freeman et al. .............. 348/13 |
| 5,724,103 A | 3/1998 | Batchelor ................... 348/553 |
| 5,731,846 A | 3/1998 | Kreitman et al. ........... 348/581 |
| 5,734,443 A | 3/1998 | O'Grady ..................... 348/705 |
| 5,778,096 A | 7/1998 | Stearns ....................... 382/233 |
| 5,781,227 A | 7/1998 | Goode et al. .................. 348/7 |
| 5,786,845 A | * 7/1998 | Tsuria ............................ 348/9 |
| 5,786,864 A | 7/1998 | Yamamoto .................. 348/473 |
| 5,796,871 A | 8/1998 | Kawamura et al. ......... 382/236 |
| 5,801,782 A | 9/1998 | Patterson .................... 348/473 |
| 5,801,786 A | 9/1998 | Song .......................... 348/564 |
| 5,802,394 A | 9/1998 | Baird et al. ................. 395/825 |
| 5,805,148 A | 9/1998 | Swamy et al. .............. 345/189 |
| 5,805,173 A | 9/1998 | Glennon et al. ............ 345/501 |
| 5,818,512 A | 10/1998 | Fuller ............................ 348/8 |
| 5,818,530 A | 10/1998 | Canfield et al. ............. 348/400 |
| 5,838,597 A | 11/1998 | Pau et al. ............... 364/715.02 |
| 5,841,472 A | 11/1998 | Rim et al. ................... 348/390 |
| 5,844,594 A | 12/1998 | Ferguson ..................... 348/10 |
| 5,844,623 A | 12/1998 | Iwamura ..................... 348/553 |
| 5,859,660 A | 1/1999 | Perkins et al. ................. 348/9 |
| 5,864,682 A | 1/1999 | Porter et al. ............ 395/200.77 |

(List continued on next page.)

Primary Examiner—John Miller
Assistant Examiner—Trang U. Tran
(74) Attorney, Agent, or Firm—Scott Charles Richardson; Walter J. Malinowski; Suiter - West

(57) ABSTRACT

A video system displays information during transition from a first video source to a second video source. During the transition, an MPEG decoder decodes a transition video signal and provides the decoded transition video signal to a video overlay which overlays the decoded transition video signal onto a display during the transition period. In one embodiment, the transition video may be a commercial video or advertisement such that the advertisement is displayed on the display during the transition. The advertisement may be related to the content of the output of one of the video sources. In the event the MPEG decoder is unavailable to decode the transition video during the transition, the video system is capable of utilizing an alternate decoder to decode the transition video.

24 Claims, 4 Drawing Sheets

U.S. PATENT DOCUMENTS

| | | |
|---|---|---|
| 5,867,208 A | 2/1999 | McLaren ................... 348/13 |
| 5,870,087 A | 2/1999 | Chau ....................... 345/302 |
| 5,881,245 A | 3/1999 | Thompson ............. 395/200.49 |
| 5,889,560 A | 3/1999 | Lee ......................... 348/402 |
| 5,898,441 A | 4/1999 | Flurry ..................... 345/507 |
| 6,025,870 A * | 2/2000 | Hardy ..................... 348/15 |
| 6,061,099 A * | 5/2000 | Hostetler ................ 348/584 |
| 6,067,092 A * | 5/2000 | Rinaldi et al. ........... 345/435 |

* cited by examiner

METHOD AND APPARATUS FOR PROVIDING INFORMATION IN VIDEO TRANSITIONS

FIELD OF THE INVENTION

The present invention generally relates to the field of information handling systems, and particularly to video displayed by an information handling system.

BACKGROUND OF THE INVENTION

In an information handling system configured to display video content, there is often a transition period when the information handling system switches from one video device or application to another video device or application. Conventional information handling systems display video using a video graphics card wherein video frames are stored in dedicated video memory such as video random access memory (VRAM). For example, while switching from one channel to another with a satellite receiver, there is a transition time resulting from the sum of acquisition time of the new channel by the satellite receiver and the delay time in emptying the first channel signal out of video memory and storing the new channel signal in video memory. Other similar transition delays occur when switching video sources such as switching to receive the signal from a satellite receiver to receiving a signal from a cable television tuner, or when switching from a first video application to a second video application such as a user interface, a media player, an electronic program guide, etc. Many other events likewise cause similar transition delay times. During such a transition delay time, the display connected to the information handling system is blank, or the last frame of the first video source is momentarily frozen (i.e., motionless) while the new video source is being loaded into video memory. It would be highly desirable to provide an information handling system capable of intentionally displaying video content during such transition events so that the utility of the time of such transitions is optimized.

SUMMARY OF THE INVENTION

The present invention is directed to a video system that is capable of displaying information such as full motion MPEG compliant video during a transition from a first video source to a second video source. In one particular embodiment, the video system includes a graphics controller for displaying video on a display, a decoder for decoding an encoded transition video, and a video overlay for overlaying the decoded transition video signal on the display during the transition. In a further embodiment, the video system includes a processor for executing a program of instructions that controls the video system where the processor is coupled to the graphics controller via a bus. In the event the decoder is unavailable to decode the encoded transition video, the video system comprises an alternate decoder for decoding the encoded transition video signal in an alternative embodiment. In a particular embodiment, the transition video signal contains commercial content or advertising, and in some embodiments the commercial content or advertising is related to the content of the video received from either the first video source or the second video source.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to presently preferred embodiments of the invention, an example of which is illustrated in the accompanying drawings.

Figure 1:
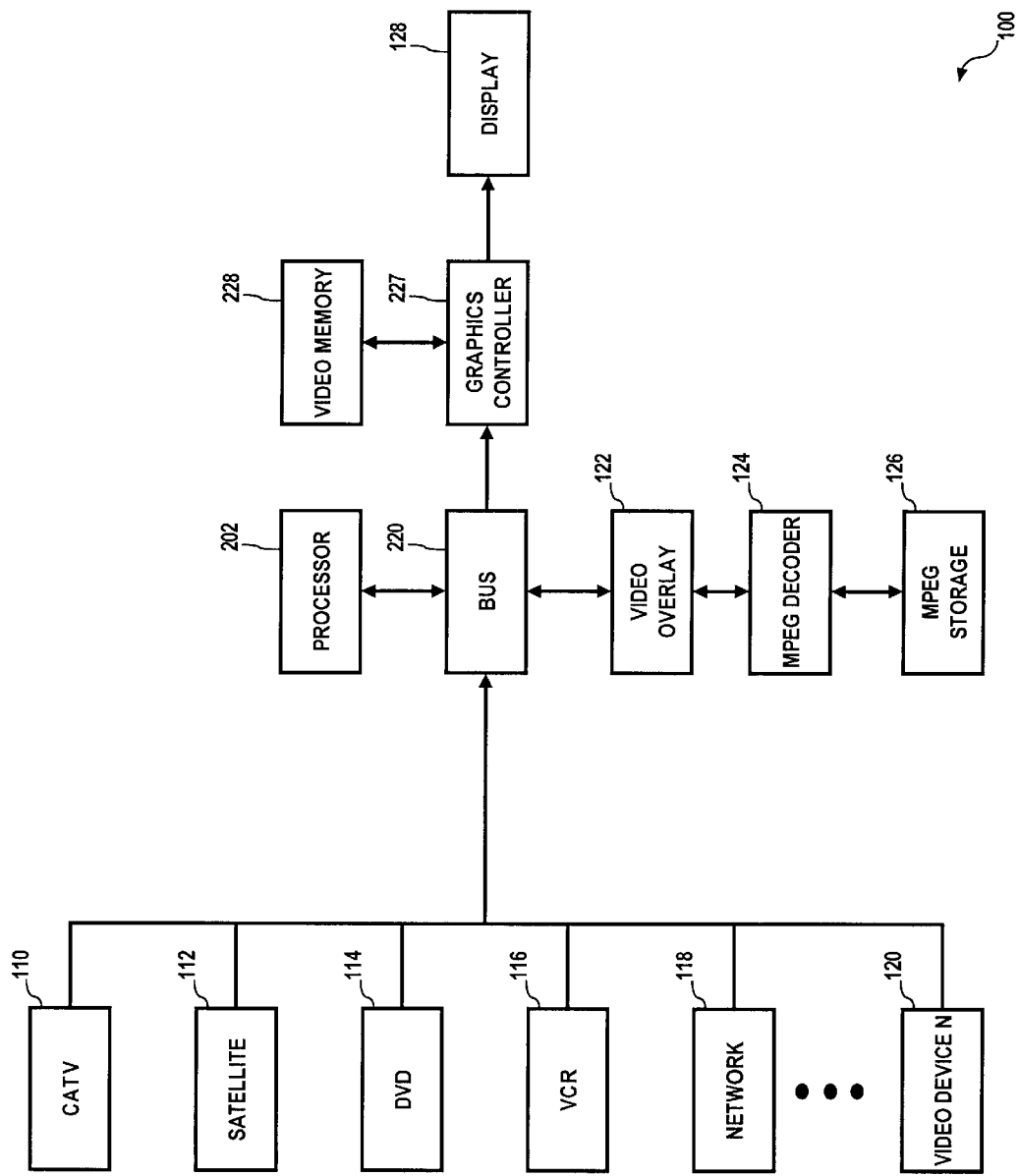
FIG. 1 is an overall block diagram of a video system that is capable of implementing the present invention.

Referring now to FIG. 1, an overall block diagram of a video system in accordance with the present invention will be discussed. Video system 100 may be a subsystem of an information handling system, such as the information handling system 200 discussed below with respect to FIG. 2, and may include one or more components thereof, and one or more peripheral devices coupled thereto. Video system 100 is operatively capable of coupling with at least one or more video sources or devices, up to an Nth video device 120. Such video sources or devices may include, for example, a cable television receiver (CATV) 110, a satellite television receiver (SATELLITE) 112, a digital versatile disk player (DVD) 114, a videocassette recorder (VCR) 116, a network adapter or modem (NETWORK) 118, or the like. Each of video devices 110–120 is capable of coupling to a bus (BUS) 220 of video system 100. A processor (PROCESSOR) 202 is coupled to bus 220 for controlling the various components of video system 100 via a program of instructions executable by processor 202. Video signals received by video system 100 via bus 220 are provided to a graphics controller (GRAPHICS CONTROLLER) 227 which includes video memory (VIDEO MEMORY) 228 such as VRAM. As a video signal is received from one of the video devices, graphics controller 227 is capable of buffering the video signal in video memory 228 until displayed on display (DISPLAY) 128. In addition, video system 100 includes a video overlay (VIDEO OVERLAY) 122 that is capable of superimposing a video or graphical image over a video signal received by graphics controller 227 and onto display 128. For example, video overlay 122 is capable of overlaying a video signal received from a video decoder (MPEG DECODER) 124 that is compliant with a Moving Pictures Expert Group (MEPG) standard. Such a video may be stored in an electronic storage device (MPEG STORAGE) 126 such as a hard disk drive of video system 100. In overall operation of the present invention, video overlay 122 is capable of superimposing a video signal provide by MPEG decoder 124 onto display 128 during transition periods occurring in a video stream received by graphics controller 227.

In one particular embodiment, the video signal superimposed by video overlay 122 received from MPEG decoder 124 is a full motion video stream. The superimposed video signal is received, for example via network 118, stored in MPEG storage 124, and available or processed in advance by MPEG decoder 124 so that video overlay 122 is readily capable of superimposing the video signal in the event a transition period is detected. In one particular embodiment, MPEG decoder 124 may already be in use and therefore unavailable in which case video overlay 122 is capable of utilizing an alternate MPEG decoder from another video device to implement a transition superimposition. For example, video overlay 122 may utilize an MPEG decoder of DVD player 114.

Figure 2:
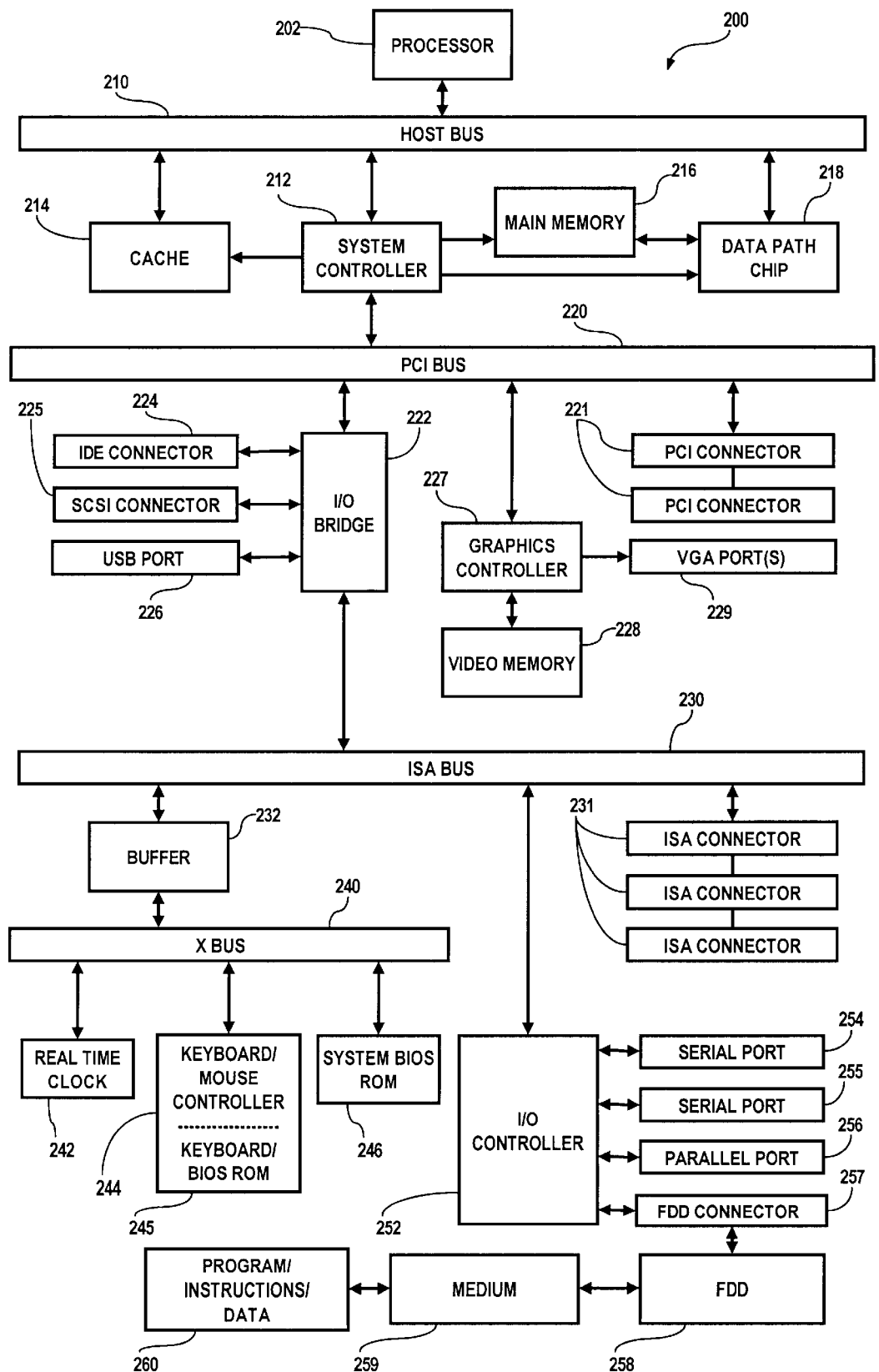
FIG. 2 is a block diagram of an information handling system operable to tangibly embody the present invention.

FIG. 2 shows a block diagram of an information handling system 200 in accordance with the present invention. Information handling system 200 is capable, in one embodiment, of implementing one or more components of video system 100 of FIG. 1. In this embodiment, processor 202, system controller 212, cache 214, and data-path chip 218 are each coupled to host bus 210. Processor 202 is a microprocessor such as a 486-type chip, a Pentium®, Pentium II®, Pentium III®, or the like suitable microprocessor. Cache 214 provides high-speed local-memory data (in one embodiment, for example, 512 KB of data) for processor 202, and is controlled by system controller 212, which loads cache 214 with data that is expected to be used soon after the data is placed in cache 214 (i.e., in the near future). Main memory 216 is coupled between system controller 212 and data-path chip 218, and in one embodiment, provides random-access memory of between 16 MB and 128 MB of data.

In one embodiment, main memory 216 is provided on SIMMs (Single In-line Memory Modules), while in another embodiment, main memory 216 is provided on DIMMs (Dual In-line Memory Modules), each of which plugs into suitable sockets provided on a motherboard holding these components and many of the other components shown in FIG. 2. Main memory 216 includes standard DRAM (Dynamic Random-Access Memory), EDO (Extended Data Out) DRAM, SDRAM (Synchronous DRAM), or the like suitable memory technology. System controller 212 controls PCI (Peripheral Component Interconnect) bus 220, a local bus for system 200 that provides a high-speed data path between processor 202 and various peripheral devices, such as video, disk, network, etc. Data-path chip 218 is also controlled by system controller 212 to assist in routing data between main memory 216, host bus 210, and PCI bus 220.

In one embodiment, PCI bus 220 provides a 32-bit-wide data path that runs at 33 MHz. In another embodiment, PCI bus 220 provides a 64-bit-wide data path that runs at 33 MHz. In yet other embodiments, PCI bus 220 provides 32-bit-wide or 64-bit-wide data paths that run at higher speeds. In one embodiment, PCI bus 220 provides connectivity to I/O bridge 222, graphics controller 227, and one or more PCI connectors 221, each of which accepts a standard PCI card (not shown). In one embodiment, I/O bridge 222 and graphics controller 227 are each integrated on the motherboard along with system controller 212, in order to avoid a board-to-connector-to-board signal crossing interface, thereby providing better speed and reliability. In the embodiment shown, graphics controller 227 is coupled to a video memory 228 that includes memory such as DRAM, EDO DRAM, SDRAM, or VRAM (Video Random-Access Memory), and drives VGA (Video Graphics Adapter) port 229. VGA port 229 can connect to VGA-type or SVGA (Super VGA)-type displays or the like. Other input/output (I/O) cards having a PCI interface can be plugged into PCI connectors 221.

In one embodiment, I/O bridge 222 is a chip that provides connection and control to one or more independent IDE connectors 224, to Small Computer System Interface (SCSI) connector 225, to a USB (Universal Serial Bus) port 226, and to ISA (Industry Standard Architecture) bus 230. In this embodiment, IDE connector 224 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices.

In one similar embodiment, two IDE connectors 224 (second connector not shown) are provided, and each provide the EIDE (Enhanced IDE) architecture. In the embodiment shown, SCSI connector 225 provides connectivity for preferably up to seven or fifteen SCSI-type devices (depending on the version of SCSI supported by the embodiment). In one embodiment, I/O bridge 222 provides ISA bus 230 having one or more ISA connectors 231 (in one embodiment, three connectors are provided). In one embodiment, ISA bus 230 is coupled to I/O controller 252, which in turn provides connections to two serial ports 254 and 255, parallel port 256, and FDD (Floppy-Disk Drive) connector 257. In one embodiment, FDD connector 257 is connected to FDD 258 that receives removable media (e.g., a floppy diskette) 259 on which data and/or program code 260 is stored.

In one such embodiment, program code 260 includes code that controls information handling system 200 to perform the method described herein. In another such embodiment, serial port 254 is connectable to a computer network such as the Internet, and such network has program code 260 that controls information handling system 200 to perform the method described herein. In one embodiment, ISA bus 230 is connected to buffer 232, which is connected to X bus 240, which provides connections to real-time clock 242, keyboard/mouse controller 244 and keyboard BIOS ROM (Basic Input/Output System Read-Only Memory) 245, and to system BIOS ROM 246. FIG. 2 shows one exemplary embodiment of the present invention, however other bus structures and memory arrangements are specifically contemplated. It should be appreciated that modification or reconfiguration of information handling system 200 of FIG. 2 by one having ordinary skill in the art would not depart from the scope or the spirit of the present invention.

Figure 3:
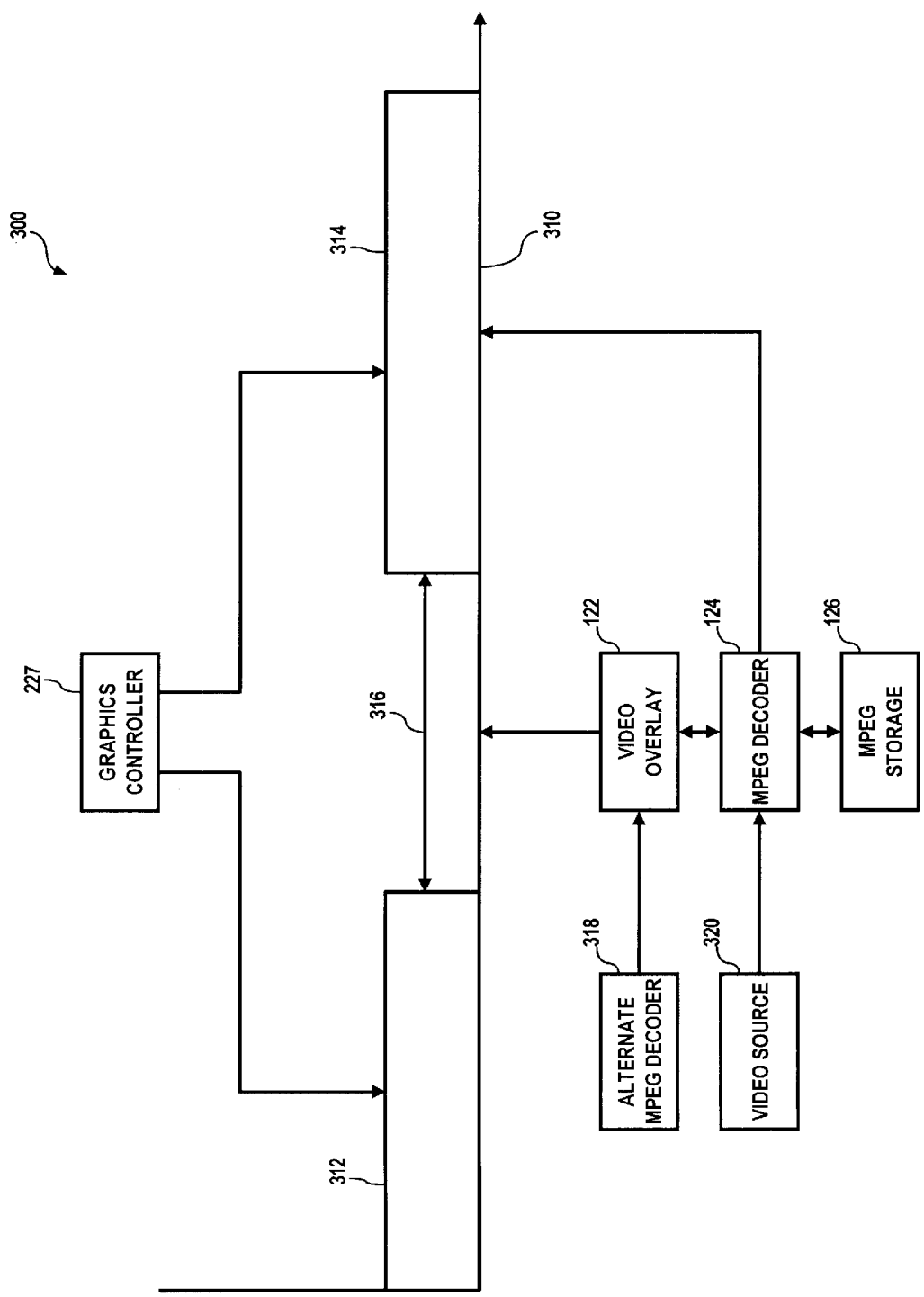
FIG. 3 is a conceptual diagram of an implementation of the present invention with respect to the flow of time in accordance with the present invention.

Referring now to FIG. 3, a conceptual diagram of an implementation of the present invention with respect to the flow of time will be discussed. As shown in diagram 300 of FIG. 3, the video signal output of graphics controller 227 is depicted with respect to time axis 310. A first video stream 312 from a first video source or application is provided by graphics controller 227 over a first period of time. When graphics controller 227 switches to a second video source, the output from the second video source is provided by graphics controller as a second video stream 314 over a second period of time. As a result of the switch from the first video source to the second video source, a time delay period or transition 316 occurs between video stream 312 and video stream 314. In accordance with the present invention, video overlay 122 provides a video signal output during transition 316 by overlaying the output of MPEG decoder 124 during transition 316 onto display 128. As shown in FIG. 3, MPEG decoder 124 is itself capable of providing any one of video streams 312 or 314 which may result in transition 316. In the event that MPEG decoder 124 is so utilized, video overlay 122 is capable of overlaying a video signal during transition 316 by utilizing an alternate MPEG decoder (ALTERNATE MPEG DECODER) 318. For example, alternate MPEG decoder 318 may be provided by a video device such as DVD player 114. The video signal decoded by MPEG decoder 124 or alternate MPEG decoder 318 and provided during transition 316 as an overlay by video overlay 122 may be obtained from an available video source 320 which may be embodied as one or more video devices or sources. For example, video source 320 may be any one of video devices 110, 112, 114, 116, 118, or 120 of FIG. 1. In one particular embodiment, where network 118 includes the Internet, the video signal provided as an overlay during transition 316 may be obtained from a content source on the Internet and decoded by MPEG decoder 124 as it is received for immediate overlay by video overlay 122, or it may be stored in MPEG storage 126 for immediate or later retrieval.

Figure 4:
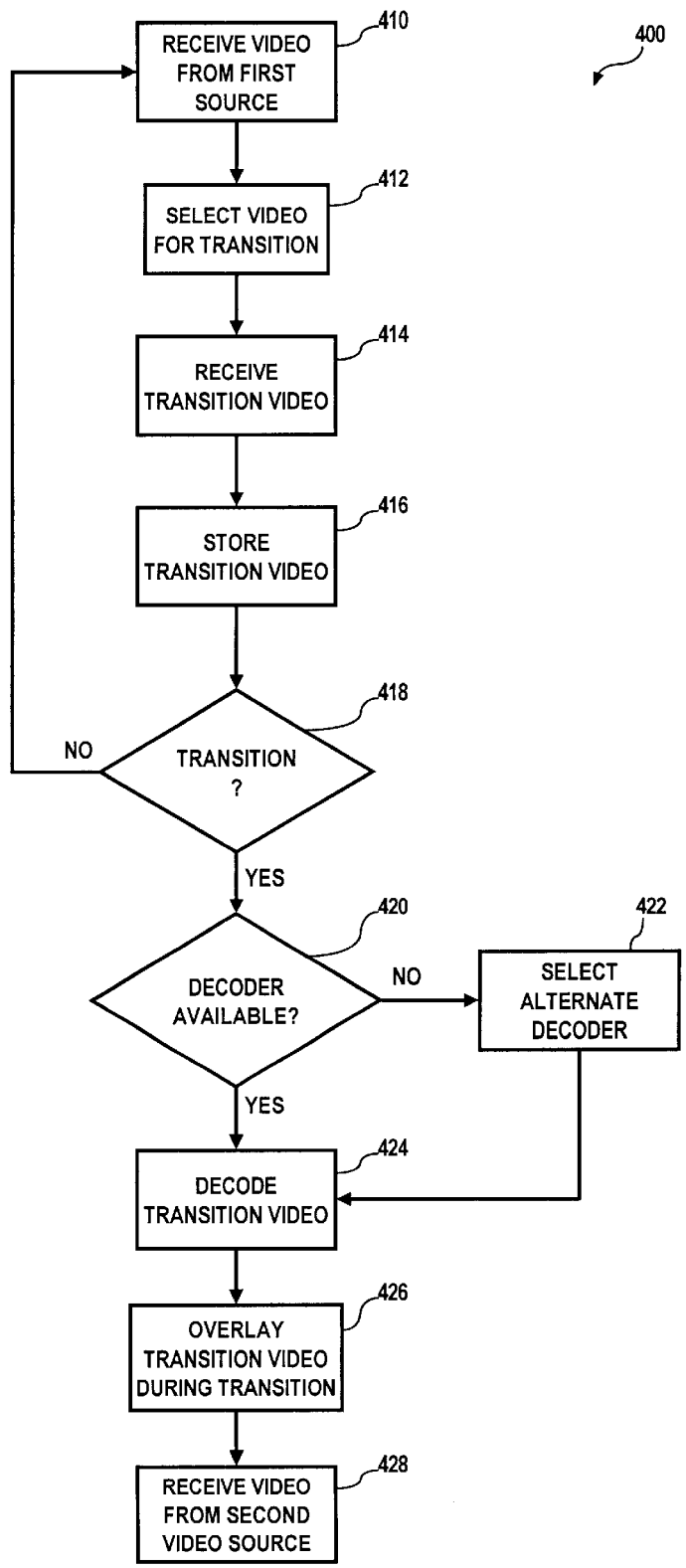
FIG. 4 is a flow diagram of a method for providing information in video transitions in accordance with the present invention.

Referring now to FIG. 4, a flow diagram of a method for providing information in a video transition in accordance with the present invention will be discussed. It is understood that the specific order, or hierarchy, disclosed in FIG. 4 is an example of one approach. Based upon design selections, it is understood that the specific order, or hierarchy, can be rearranged while remaining within the scope of the invention. The corresponding method claims herein present elements of the various steps in a sample order, and is not meant to be limited to the specific order or hierarchy presented. During execution of method 400, video is received from a first video source at step 410. Video to be played during a transition event is selected at step 412. The transition video is received from an appropriate source at step 414, and the transition video is stored at step 416. A determination is made at step 418 whether a transition occurs. In the event no transition occurs, video is continued to be received from the first video source at step 410. In the event a transition occurs, a determination is made at step 420 whether MPEG decoder 124 is available to decode a video signal to be overlaid during transition 316. In the event MPEG decoder 124 is not available, alternate decoder 318 is selected at step 422 to decode the transition video. After selection at step 422, or in the event MPEG decoder 124 is available, the transition video is decoded at step 424, and video overlay 122 overlays the transition video at step 426 during transition 316. Video is received from a second video source at step 428 so that it may be displayed at the termination of transition 316.

In one particular embodiment of the present invention, a method of doing business is capable of being implemented by video system 100 using method 400. For example, the video overlaid during transition 316 may be sold as advertising so that the overlaid video may contain commercial content. A message or logo of the advertiser is then displayed during transition 316. In one embodiment, the video selected, including commercial video content, is capable of being based upon the content of the video signals received from a video source and displayed by graphics controller 227. For example, video system 100 is capable of detecting the station program content being received via cable television receiver 110. This may be accomplished by detecting the station selected or entered by a user and comparing the selected station to an electronic program guide database that indicates the content of the signal received on the selected station and the time of the broadcast. For example, a user may be watching a golf tournament on a particular station of cable television receiver 110. When the golf tournament is detected, video system 100 selects a golf transition video at step 412, and receives the golf transition video at step 414, for example, from an information handling system of a golf club manufacturer coupled to the Internet via network 118. The golf transition video, which in this case may be an advertisement, is stored at step 416 until a transition occurs. At the occurrence of a transition, the golf transition video is overlaid during the transition. In a particular embodiment, video system 100 tracks the number of times that the golf transition video is displayed and reports back overlay history information and billing information to the golf club manufacture, for example, via network 118 to an information handling system of the manufacturer.

While it is understood that a preferred embodiment of the present invention places a video transition into a system's normally generated transition period, for purposes of defining a method of doing business, the system of the present invention may be designed to generate and provide a predetermined transition period when switching from one video source or channel to another video source or channel, in order to ensure a complete presentation of a video transition.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 216 of one or more computer information handling systems configured generally as described in FIG. 2. Until required by the computer system, the set of instructions may be stored in another computer readable memory such as information storage medium 259 of FIG. 2. Examples include a hard disk drive, a removable memory such as an optical disk for utilization in a CD-ROM drive, a floppy disk for utilization in a floppy disk drive, a floppy/optical disk for utilization in a floppy/optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions, applets or servlets physically changes the medium upon which it is stored electrically, magnetically, chemically, physically, optically or holographically so that the medium carries computer readable information.

It is believed that the method and apparatus for providing information in video transitions of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An apparatus, comprising:
   means for providing an output to a display in response to an input signal received from a video source, said output providing means including means for buffering the input signal;
   means for decoding an encoded video signal into a decoded video signal, said decoding means being a decoder compliant with an MPEG standard; and
   means, coupled to said output providing means, for overlaying the decoded video signal decoded by said decoding means onto the display during the transition when said output providing means switches from a first video source to a second video source.

2. The apparatus as claimed in claim 1, said output providing means comprising a graphics controller and said buffering means comprising video memory.

3. The apparatus as claimed in claim 1, said overlaying means comprising a video overlay.

4. The apparatus as claimed in claim 1, said output providing means comprising a graphics controller, said buffering means comprising video memory, and said overlaying means comprising a video overlay.

5. The apparatus as claimed in claim 1, said decoding means being capable of receiving the coded video signal via a network.

6. The apparatus as claimed in claim 1, said decoding means being capable of decoding an encoded commercial video signal into a decoded commercial video signal such that said overlaying means overlays the decoded commercial video signal during the transition.

7. The apparatus as claimed in claim 1, said decoding means being capable of decoding a video signal containing advertisement information into a decoded commercial video signal containing advertisement information such that said overlaying means overlays the decoded video signal containing advertisement information during the transition.

8. The apparatus as claimed in claim 1, further comprising means for storing an encoded signal such that the encoded signal is available to be decoded by said decoding means upon an occurrence of the transition.

9. The apparatus as claimed in claim 1, further comprising a memory capable of storing an encoded signal such that the encoded signal is available to be decoded by said decoding means upon an occurrence of the transition.

10. The apparatus as claimed in claim 1, further comprising a processor for executing a program of instructions that controls the apparatus, said processor being coupled to said output providing means via a bus.

11. The apparatus as claimed in claim 1, wherein said apparatus comprises a plurality of encoded video signals, said apparatus being capable of selecting a specific encoded video signal for decoding and display during the transition based upon said encoded video signal's relevance to either a content's subject matter displayed by the first video source prior to the transition or a content's subject matter selected for display via the second video source following the transition.

12. The apparatus as claimed in claim 1, wherein said apparatus is capable of extending the transition to a predetermined time duration when said output providing means switches from the first video source to the second video source, thereby ensuring that the decoded video signal is capable of being displayed in its entirety.

13. A method, comprising:
receiving video from a first video source such that the video from the first video source is displayed on a display;
determining whether a transition will occur when switching from the first video source to a second video source;
in the event it is determined that a transition will occur, decoding an encoded transition video;
overlaying the decoded transition video during the transition such that the transition video is displayed on the display; and
receiving video from the second video source such that the video from the second video source is displayed on the display.

14. The method as claimed in claim 13, further comprising the steps of, determining whether a first video decoder is available to decode the encoded transition video during the transition, and, in the event it is determined that the first video decoder is not available, decoding the encoded transition video with a second decoder.

15. The method as claimed in claim 13, further comprising the step of receiving the encoded transition video via a network.

16. The method as claimed in claim 13, further comprising the step of storing the encoded transition video such that the encoded transition video is available to be decoded upon an occurrence of a transition.

17. The method as claimed in claim 13, further comprising the step of selecting a specific encoded transition video for decoding and display during the transition from a plurality of encoded transition videos based upon said encoded transition video's relevance to either a content's subject matter displayed by the first video source prior to the transition or a content's subject matter selected for display via the second video source following the transition.

18. The method as claimed in claim 13, further comprising the step of extending the transition to a predetermined time duration when switching from the first video source to a second video source, thereby ensuring that the decoded transition video is capable of being displayed in its entirety.

19. A program of instructions storable on a medium readable by an information handling system for causing an information handling system to execute steps for displaying information during a transition from a first video source to a second video source, the steps comprising:
receiving video from a first video source such that the video from the first video source is displayed on a display;
determining whether a transition will occur when switching from the first video source to a second video source;
in the event it is determined that a transition will occur, decoding an encoded transition video;
overlaying the decoded transition video during the transition such that the transition video is displayed on the display; and
receiving video from the second video source such that the video from the second video source is displayed on the display.

20. The program of instructions as claimed in claim 19, the steps further comprising the steps of, determining whether a first video decoder is available to decode the encoded transition video during the transition, and, in the event it is determined that the first video decoder is not available, decoding the encoded transition video with a second decoder.

21. The program of instructions as claimed in claim 19, the steps further comprising the step of receiving the encoded transition video via a network.

22. The program of instructions as claimed in claim 19, the steps further comprising the step of storing the encoded transition video such that the encoded transition video is available to be decoded upon an occurrence of a transition.

23. The program of instructions as claimed in claim 19, the steps further comprising the step of selecting a specific encoded transition video for decoding and display during the transition from a plurality of encoded transition videos based upon said encoded transition video's relevance to either a content's subject matter displayed by the first video source prior to the transition or a content's subject matter selected for display via the second video source following the transition.

24. The program of instructions as claimed in claim 19, the steps further comprising the step of extending the transition to a predetermined time duration when switching from the first video source to a second video source, thereby ensuring that the decoded transition video is capable of being displayed in its entirety.

* * * * *